SKI MOUNTING APPARATUS FOR SNOWMOBILES
Original Filed Oct. 4, 1968
FIG. 1
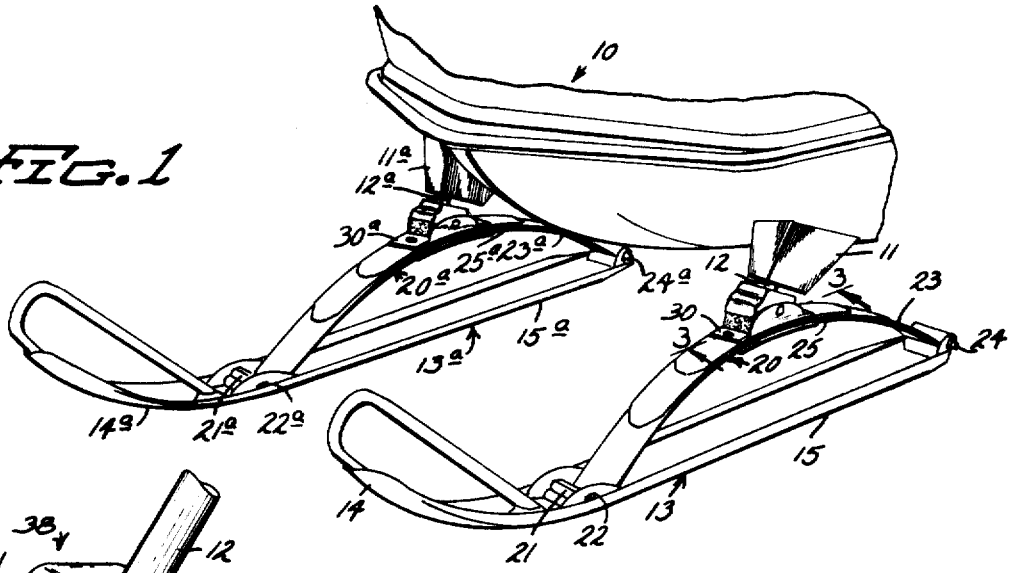
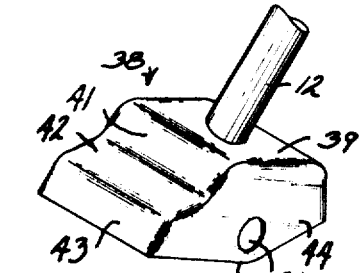
FIG. 2
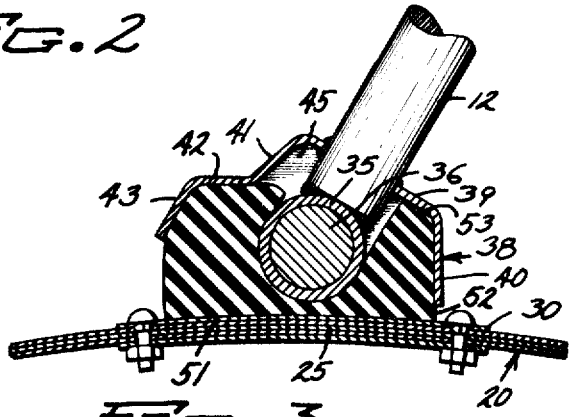
FIG. 3
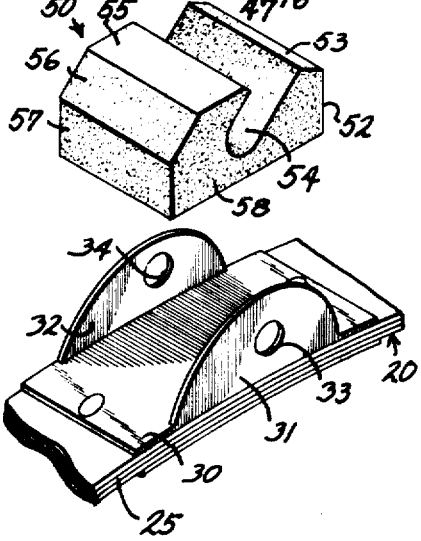
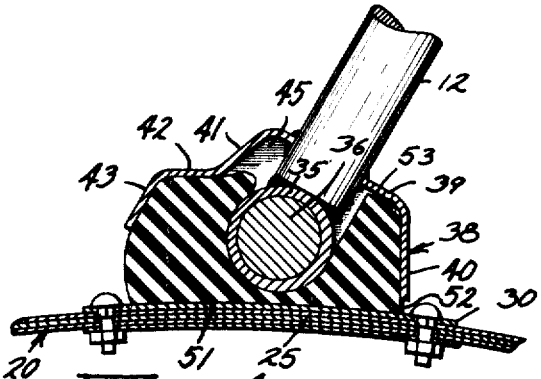
FIG. 4
FIG. 5
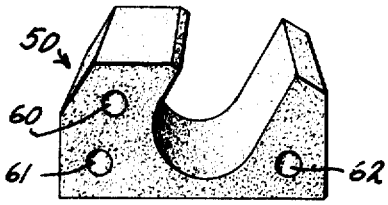
INVENTOR
Albin R. Erickson
BY
Merchant & Gould
ATTORNEYS United States Patent Office Re. 27,676
Reissued June 19, 1973

27,676

SKI MOUNTING APPARATUS FOR SNOWMOBILES

Albin R. Erickson, Roseau, Minn., assignor to Textron Inc., Providence, R.I.

Original No. 3,525,412, dated Aug. 25, 1970, Ser. No. 765,160, Oct. 4, 1968. Application for reissue Dec. 27, 1971, Ser. No. 212,442
Int. Cl. B62d *13/12;* B62n *27/02*
U.S. Cl. 180—5 R 8 Claims

Matter enclosed in heavy brackets [ ] appears in the original patent but forms no part of this reissue specification; matter printed in italics indicates the additions made by reissue.

ABSTRACT OF THE DISCLOSURE

The nose portion of a snowmobile is shown including a pair of spaced steering shafts extending downwardly therefrom for mounting a pair of skis. A mounting is provided for each ski that permits limited pivotal movement of the ski. A flexible rubber snubber member is included as a part of the ski mounting apparatus to oppose the pivotal movements of the ski and to provide a restoring force to the ski tending to return the ski to a normal position.

BACKGROUND OF THE INVENTION

Field of the invention

This invention relates generally to self-propelled snow vehicles and more particularly relates to an improved structure for mounting a pair of skis to the nose portion of such a vehicle.

Description of the Prior Art

The most popular type of snowmobile being used today employs an endless track to support the rear end of the vehicle and to drive the vehicle. The nose portion of the vehicle is supported by a pair of spaced skis that are connected by a suitable linkage to a steering wheel or bar. The two skis can thus be turned simultaneously to the left or right to steer the vehicle.

Each ski is normally mounted on the bottom end of a steering shaft that extends downwardly from the nose portion of the vehicle. The mounting is such that the ski cannot twist from side to side with respect to the shaft, nor can it rotate with respect to the shaft. However, it is normal practice to permit the skis to pivot upwardly and downwardly about their connection to the shaft so that the skis will more closely follow variations in the terrain. Typically, the pivotal mounting is such that the front end of each ski can move upwardly through a relatively large arc in order to reduce the shock that occurs when an obstacle is encountered and to keep as much of the ski as possible in contact with the ground at all times. The downward movement of the front end of the ski is normally limited, however, so that there is no tendency for the ski to pass under objects that are encountered.

In prior art ski mounting systems, this pivotal movement of the ski with respect to the steering shaft was not controlled except as to its limits. The mounting was such that the ski could freely pivot within its established limits of pivotal movement. While this permitted the ski to quickly accommodate itself to variations in terrian, it also caused certain problems to occur. The snowmobile of today is a high speed vehicle and it is not uncommon for the skis to leave the ground after passing over a small hill or other obstacle. One of the enjoyable features of a snowmobile is that it will literally fly through the air after passing over a suitable hill or jump. Under such circumstances, the skis are of course not in contact with the snow surfaces. Therefore, they are free to oscillate or move within the confines of the mounting assembly. When using prior art pivotal mounting systems, the skis would normally oscillate or rock rather wildly and indiscriminately through the arc of movement permitted by the mounting system. Because of this, the skis were rarely in a generally horizontal position when the vehicle returned to the ground. In fact, the two skis were normally in different positions and more nearly vertical than horizontal. With the skis in such a position, their rear ends would make the first contact with the grounnd causing the skis to immediately pivot forwardly to their normal position and slap with great force against the ground. A landing such as this would impart two severe shocks to the vehicle and its operator, one at the time the rear ends of the skis made contact and the other when the front portions of the skis encountered the ground surface. This type of landing was not only uncomfortable for the rider but also imparted unnecessary stresses to the mounting system and the vehicle itself.

The prior art mounting system was also potentially dangerous to the operator. If, during the landing from a jump, one ski was generally vertical and the other generally horizontal, the rear end of the generally vertical ski would make first contact with the ground, causing a shock to be imparted to only one side of the vehicle. This tended to twist the vehicle and would under severe circumstances cause the vehicle to tip over in a direction away from first contact. In any event, it would usually cause the vehicle to rock back and forth for a period of time before again attaining stability.

The overall effect of such a mounting system was to impart unnecessary shocks to the vehicle and to its rider, and to decrease the stability of the vehicle. Under normal operating circumstances, it was possible for the operator to lose control of the vehicle during a jump and its subsequent landing, and in racing situations, much time was lost in stabilizing the vehicle after a jump.

SUMMARY OF THE INVENTION

The present invention provides apparatus for stabilizing the skis on a snow vehicle in order to overcome these problems. A rubber insert member is mounted, under compression, in the pivotal mounting assembly such that it becomes deformed upon pivoting of the ski to thereby exert a restoring force to return the ski to its normal position. Since the rubber insert member is flexible, it permits the ski to pivot in response to terrain variations but, as soon as pressure on the ski is removed, the insert member will cause the ski to return to its normally horizontal position. Therefore, as soon as the ski leaves the ground, the rubber insert member will force the ski back to its normal position such that it strikes the ground along its entire length. Both skis will thus return to the ground at the same time, thus avoiding the double shock that sometimes occurs with the prior art system and also avoiding the possibility of tipping the vehicle. The present invention thus reduces shock to the vehicle and its operator, reduces the possibility of tipping the vehicle after a jump, and also permits the vehicle to become stabilized much more quickly after a jump.

BRIEF DESCRIPTION OF THE DRAWINGS

FIG. 1 is a view in perspective of the nose portion of a snowmobile, including a pair of skis for supporting and steering the vehicle;

FIG. 2 is an exploded perspective view of the pivotal ski mounting system shown in FIG. 1;

FIG. 3 is a vertical sectional view of the ski mounting system taken generally along line 3—3 of FIG. 1;

FIG. 4 is a view similar to that shown in FIG. 3, showing the deformation of the rubber insert member when the ski is pivoted upwardly at its front end; and FIG. 5 is a view in perspective of an alternate embodiment of the rubber insert member.

DESCRIPTION OF THE PREFERRED EMBODIMENTS

Referring now to the drawings, wherein like reference numerals are used throughout the several views to indicate like elements of the invention, there is disclosed in FIG. 1 a nose portion 10 of a snowmobile. Extending generally downwardly from opposite sides of nose portion 10 are a pair of shaft support housings 11 and 11a. Extending downwardly and forwardly from housing 11 and 11a are a pair of spaced steering shafts 12 and 12a, respectively. The top ends of shafts 12 and 12a are connected by a suitable linkage to a steering wheel or bar that permits the operator to simultaneously rotate shafts 12 and 12a in either direction.

Mounted to the bottom end of the shafts 12 and 12a are a pair of skis 13 and 13a. The skis have an upwardly turned front end 14, 14a and a flat ground engaging portion 15, 15a extending rearwardly therefrom and terminating in rear ends 16, 16a. Skis 13 and 13a are preferably constructed from metal and are somewhat resilient in order to aid in absorbing shocks.

Mounted on each ski is a curved leaf spring 20, 20a having the forward end 21, 21a thereof connected to the associated front end 14, 14a of the skis by means of suitable brackets 22, 22a. The rear ends 23, 23a of leaf springs 20, 20a are pivotally connected to the rear ends 16, 16a of the skis 13, 13a by means of a suitable bracket and pin arrangement 24, 24a. Each of the leaf springs 20, 20a also includes a curved central portion 25, 25a that is spaced above the associated ski. The leaf springs 20, 20a act in their normal fashion to absorb shocks being imparted to the vehicle so that a more detailed account of their structure and function is not believed to be necessary.

The structure for pivotally connecting ski 13 to steering shaft 12 will now be discussed in more detail, it being understood that the same construction is utilized to attach ski 13a to shaft 12a. Referring particularly to FIGS. 2–4, it can be seen that a plate member 30 is mounted on the upper surface of central portion 25 of leaf spring 20. As best shown in FIG. 3, plate member 30 is preferably bolted to central portion 25. Plate member 30 is curved to fit closely against the upper surface of central portion 25 and is the same width as central portion 25. Plate member 30 has a pair of flanges 31 and 32 extending upwardly from opposite sides thereof. Each of the flanges 31 and 32 is a flat metal member having a curved upper edge. Flanges 31 and 32 lie in parallel planes and are provided with a pair of aligned openings 33 and 34.

A laterally extending sleeve member 35 is secured to the bottom end of shaft 12, preferably by welding or the like. Sleeve member 35 and shaft 12 thus form a T with sleeve member 35 extending transversely to the direction of travel of the vehicle. Sleeve member 35 is positioned between flanges 31 and 32 and is secured thereto by means of a pin 36 that extends through openings 33 and 34 and through sleeve member 35. The ends of the sleeve member 35 abut the inner surface of flanges 31 and 32 to prevent lateral shifting of shaft 12 with respect to leaf spring 20. When shaft 12 is rotated by the steering apparatus, sleeve member 35 will rotate with it to in turn cause rotation of leaf spring 20 and ski 13. It can be seen that this pivotal connection prohibits any relative rotation between shaft 12 and ski 13, prohibits any lateral rocking of ski 13, but permits pivotal movements of ski 13 about an axis corresponding to pin 36.

A unitary housing member 38 is mounted on the bottom of shaft 12. Housing member 38 includes a generally rectangular top wall portion 39 having a central opening therein through which extends shaft 12. Top wall portion 39 is welded to shaft 12 as shown in FIG. 3.

Top wall portion 39 is connected generally perpendicular to shaft 12 and extends forwardly and rearwardly thereof, and to the sides thereof. A rear wall portion 40 of housing member 38 extends generally vertically downwardly from the rear edge of top wall portion 39 and terminates a short distance above plate member 30, as best shown in FIG. 3. The bottom edge of rear wall portion 40 acts as a stop to permit only a small amount of counterclockwise pivoting of ski 13 as viewed in FIGS. 1 and 3. Housing member 38 also includes a front wall portion comprising a first subportion 41 extending downwardly from the front edge of top wall portion 39 generally parallel to shaft 12, a second subportion 42 extending forwardly therefrom in a generally horizontal direction, and a third subportion 43 extending forwardly and downwardly therefrom generally parallel to shaft 12. The horizontal and vertical directions referred to above are made with reference to the ski in its normal horizontally extending position as shown in FIG. 1. The bottom edge of third subportion 43 terminates a considerable distance above plate member 30, at a level slightly above the level of the center of pin 36. The bottom edge of third subportion 43 again acts as a stop or limit to restrict the arc through which ski 13 can pivot upwardly at its forward end.

Housing member 38 also includes a pair of opposite side wall portions 44 and 45. Each side wall portion 44 and 45 is connected along its entire upper edge to the front, top and rear wall portions of housing member 38. Side wall portion 44 is provided with an opening 46 and side wall portion 45 is provided with an identical opening. Side wall portions 44 and 45 are positioned adjacent flanges 31 and 32 respectively and pin 36 extends through opening 46 and the other corresponding opening in side wall portion 45. Side wall portions 44 and 45 lie in parallel planes and fit between the two upstanding flanges 31 and 32. The bottom edge of side wall portion 44 defines an apex 47 located beneath opening 46 which is positioned just above the surface of plate member 30. The bottom edge of side wall portion 44 follows a straight line from apex 47 to the bottom edge of third subportion 43 and from apex 47 in the opposite direction to the bottom edge of rear wall portion 40. The bottom edge of side wall portion 45 is formed in a similar manner. Therefore, the bottom edges of side wall portions 44 and 45 also act as stop members to limit the pivotal movements of the ski about pin 36.

A rubber insert member or snubber member 50 is mounted between plate member 30 and housing member 38. Rubber insert member 50 includes a bottom face 51 which rests on and conforms to the upper surface of plate member 30.

Assuming that bottom face 51 of inert member 50 is lying in a generally horizontal plane, insert member 50 has a vertically extending rear end face 52 connected at its upper edge to a top face 53 having a transversely extending groove 54 formed therein. Insert member 50 also includes a front face comprising three separate subfaces. The three separate front subfaces include a first subface 55 extending forwardly in a horizontal direction from top face 53, a second subface 56 extending generally forwardly and downwardly therefrom, and a third subface 57 extending vertically downwardly therefrom and connecting with the front edge of bottom face 51. The edges of all the faces of insert member 50 and the edges of groove 54 define a pair of opposite, parallel side faces, one of which is shown in FIG. 2 and identified by the numeral 58.

To assemble the unit, insert member 50 is inserted upwardly into the open bottom of housing member 38. As best shown in FIG. 3, sleeve member 35 is fixedly positioned within housing member 38. The dimensions of transverse groove 54 are such that sleeve member 35 will slide downwardly into groove 54 and fit snugly against the curved bottom portion thereof. Preferably, the width of slot or groove 54 in the rubber insert member 50 should be slightly smaller than the diameter of sleeve member 35 so that a snug or tight fit is achieved, as shown in FIG. 3.

After insert member 50 has been properly inserted into housing member 38, rear face 52 will be in contact with rear wall portion 40, the part of top face 53 that lies to the rear of groove 54 will be in contact with top wall portion 39, first surface 55 will be in contact with second subportion 42, second subface 56 will be in contact with third subportion 43, and the side faces 58 of insert member 50 will be in close contact with the inner surfaces of side wall portions 44 and 45. Again, the outer dimensions of insert member 50 are preferably slightly larger than the inner dimensions of the corresponding features of housing member 38 so that a snug fit will be achieved. Because of this snug fit, the rubber insert member 50 will always be under a slight amount of compression so that any movement of housing member 38 with respect to plate member 30 will immediately cause flexing of the rubber.

After the rubber insert member 50 has been properly inserted within housing member 38, housing member 38 is placed between flanges 31 and 32 and pin 36 is then inserted to lock the two members together. Since rubber insert member 50 is somewhat flexible, it will permit ski 13 to pivot about pin 36 in response to variations in terrain. However, any pivoting of ski 13 with respect to shaft 12 will require that rubber insert member 50 be deformed to accommodate the change in position of housing member 38 with respect to plate member 30. The rubber insert member 50 cannot actually be compressed, but it can be deformed by causing the rubber to flow into areas where it is not restricted. FIG. 3 discloses the normal position of the unit, in which rubber insert member 50 is not deformed. Insert member 50 is tightly compressed between housing member 38 and plate member 30, but it is not physically deformed to any substantial degree. FIG. 4 discloses what happens to insert member 50 when the front end of ski 13 is pivoted upwardly about pin 36. When this occurs, the distance between the upper surface of plate member 30 and subportions 42 and 43 of housing member 38 decreases so that insert member 50 is deformed. The third front subface 57 of insert member 50 thus bulges outwardly as shown in FIG. 4 since it is not constricted by any metal support member. At the same time, the small portion of top face 53 that lies ahead of shaft 12 is bulged upwardly into the open area between first subportion 41 and shaft 12. The portion of top face 53 that lies to the rear of shaft 12 pulls free from the inner surface of top wall portion 39 since the pivotal movement of the ski cause the distance between that part of top wall portion 39 and plate member 30 to increase. In the deformed condition shown in FIG. 4, rubber insert member 50 is exerting a strong restoring force to the ski tending to return the ski to its normal position as shown in FIG. 1. Therefore, if the ski leaves the ground, the rubber insert member will tend to immediately snub out any oscillation of the ski that would otherwise occur so that the ski returns to a horizontal position before again reaching the ground. The problems heretofore discussed with respect to prior art pivotal mounting structures are thereby overcome.

FIG. 5 discloses an alternate form of rubber insert member for use in the present invention. The overall form of the insert member is the same as that previously described, but the insert member of FIG. 5 has been provided with a plurality of transversely extending holes or openings 60, 61 and 62 that extend between the opposite side faces thereof. The purpose of these holes is to increase the flexibility of insert member 50 by providing more room into which the rubber can deform. Since the rubber is not compressible, a certain amount of space must always be provided into which the rubber can deform. By forming a number of openings such as 60, 61 and 62 in rubber insert member 50, its resistance to deformation will be decreased so that it will be easier to pivot the ski. The amount of resistance to pivotal movement provided by rubber insert member 50 can thus be changed or regulated by forming holes, cavities or other voids in insert member 50. FIG. 5 discloses just one way of regulating the deformation resistance qualities of the rubber insert member.

In the event that rubber insert member 50 would wear out after extended usage, it is a simple matter to replace it with a new insert member. Pin 36 is removed, the old insert member taken out, a new inesert member assembled by inserting pin 36. This removable feature also permits the type of insert member to be changed so that differing amounts of restoring force can be utilized for different operating conditions. The insert member can be constructed from differing types of rubber to achieve different restoring forces, or openings can be formed in the insert member as discussed with respect to the member shown in FIG. 5. In all cases, however, it is important that the rubber insert member fit snugly within the housing member 38 so that the rubber begins to deform as soon as any pivoting occurs. The rubber will thus begin to immediately exert a restoring force to the ski as soon as it moves from its normal horizontal position

What is claimed is:

1. A snow vehicle, comprising:

(a) a frame having a nose portion;

(b) steering means for said vehicle including a pair of skis and a pair of spaced steering shafts extending downwardly from said nose portion, each of said shafts having a laterally extending sleeve member mounted on the end thereof;

(c) each of said skis having curved leaf spring means mounted thereon, each of said leaf spring means having a pair of opposite ends connected to said associated ski and a curved central portion spaced from said ski;

(d) a plate member mounted on the upper surface of each central portion, said plate member having a pair of flanges extending upwardly from opposite sides thereof;

(e) a unitary housing member mounted on the bottom end of each of said steering shafts, said housing member having a top wall portion connected to and extending forwardly and rearwardly of said shaft, a front wall portion and a rear wall portion extending generally downwardly from the front and rear edges of said top wall portion, and a pair of opposite side wall portions, said side wall portions each being positioned adjacent one of said flanges, said sleeve member being positioned within said housing member and extending between the side wall portions thereof;

(f) a pivot pin for each ski, extending through aligned openings in said flanges and side wall portions and through said sleeve member perpendicular to said associated ski, said skis thereby being pivotable about said pivot pins; and (g) a rubber insert member mounted between each of said plate members and said associated housing member, said insert member having a bottom face resting on said plate member, front and rear end faces that fit snugly against the inner surfaces of said front and rear wall portions of said housing member respectively, and a top face with a transversely extending groove formed therein to accommodate said sleeve member.

2. The apparatus of claim 1 wherein said steering shaft for each ski forms an acute angle with the upper generally horizontal surface of said central portion extending rearwardly therefrom, wherein said top wall portion of said housing member is mounted generally perpendicular to said shaft, wherein said rear wall portion extends generally vertically downwardly from said top wall portion and wherein said front wall portion includes a first subportion extending from the front edge of said top wall portion generally parallel to said shaft, a second subportion extending forwardly in a generally horizontal direction therefrom, and a third subportion extending therefrom generally parallel to said shaft, said front end face of said insert member snugly interfitting said second and third subportions.

3. In a snow vehicle having a body with a nose portion, a steering shaft extending downwardly from said nose portion and a ski mounted on the end of said shaft, means for securing said ski to said shaft, comprising:

(a) a plate member having a pair of spaced flanges extending upwardly therefrom;

(b) means for securing said plate member to said ski;

(c) a box-like housing member mounted on the bottom end of said shaft, said housing member having a top wall portion connected to the shaft and having a front wall portion and a rear wall portion extending generally downwardly therefrom, and a pair of opposite side wall portions positioned adjacent said flanges;

(d) means including pin means extending through said flanges and side wall portions generally perpendicular to said ski to permit limited pivotal movements of said ski on said shaft; and (e) a flexible snubber member mounted between said plate member and said housing member, said snubber member having portions thereof snugly fitting against said plate member and said front and rear wall portions, and having a transverse groove formed therein to accommodate said pin means, said flexible snubber member becoming deformed upon pivoting of said ski about said pin means to thereby exert a restoring force to return said ski to its normal position.

4. The apparatus of claim 3 wherein said front wall portion includes a first subportion extending downwardly from the front edge of said top wall portion, a second subportion extending forwardly in a generally horizontal direction therefrom, and a third subportion extending generally downwardly therefrom, said snubber member snugly interfitting said second and third subportions.

5. The apparatus of claim 3 wherein at least one opening is formed in said snubber member to facilitate deformation thereof.

6. In a snow vehicle having a body with a nose portion, a steering shaft extending downwardly from said nose portion and a ski mounted on the end of said shaft, means for securing said ski to said shaft, comprising:

(a) a plate member having a pair of spaced flanges extending upwardly therefrom;

(b) means for securing said plate member to said ski;

(c) a laterally extending sleeve member secured to the end of said shaft;

(d) a pivot pin extending through said flanges and sleeve member generally perpendicular to said ski to permit limited pivotal movements of said ski;

(e) a housing member mounted on said shaft, said housing member having a top wall portion secured to said shaft above said sleeve member and having a front wall portion and a rear wall portion extending generally downwardly therefrom; and (f) a flexible snubber member mounted between said plate member and said housing member, said snubber member having portions thereof snugly fitting against said plate member and said front and rear wall portions, and against at least part of said top wall portion, and having a transverse groove formed therein to snugly accommodate said sleeve member, said flexible snubber member becoming deformed upon pivoting of said ski about said pivot pin to thereby exert a restoring force to return said ski to its normal position.

7. *In a snowmoble having a body, steering shaft means extending downwardly from said snowmobile body, and at least one front-running ski means connected to said shaft means for supporting and steering said snowmobile:*

*(a) a plate member having a pair of spaced generally parallel flanges extending upwardly from opposite side edges thereof;*

*(b) means for securing said plate member to said ski means;*

*(c) said shaft means having non-resilient means including pin means thereon extending through openings in said flanges generally perpendicular to said ski means to support said snowmobile body upon said ski means and to permit pivotal movements of said ski means about the axis of said pin means to thereby permit said ski means to closely follow the terrain;*

*(d) a flexible nonmetallic snubber member mounted between said plate member and said shaft means substantially surrounding said pin means; and*

*(e) means on said shaft means for deforming said snubber member upon pivoting of said ski means about said pin means axis to thereby exert a restoring force to return said ski means to a normal position.*

8. *A suspension system for a snowmobile having a body with a nose portion, a steering shaft extending downwardly from said nose portion, a front-running ski mounted on the end of said shaft, and means for securing said ski to said shaft, comprising:*

*(a) a plate member having a pair of spaced flanges extending upwardly from opposite sides thereof;*

*(b) means including leaf spring means for securing said plate member to said ski;*

*(c) housing means on the shaft;*

*(d) said shaft having non-resilient means including pin means thereon extending through and supported by openings in said flanges generally perpendicular to said ski to support said body on said ski and to permit limited pivotal movements of said ski about the axis of said pin means and with respect to said housing means and shaft to thereby permit the ski to closely follow the terrain; and*

*(e) a structurally separate snubber member mounted between and engaged by said plate member and said housing means, said snubber member becoming deformed by said plate member and said housing means upon pivoting of said ski about said pin means to thereby damp oscillation of the ski about the pivotal connection.*

References Cited

The following references, cited by the Examiner, are of record in the patented file of this patent or the original patent.

UNITED STATES PATENTS

| | | | |
|---|---|---|---|
| 2,708,978 | 5/1955 | Robitaille | 180—5 R X |
| 3,525,411 | 8/1970 | Hagen | 180—5 R |
| 3,623,563 | 11/1971 | Gostomski | 180—5 R |
| 380,172 | 3/1888 | Bostick | 280—26 |
| 2,925,873 | 2/1960 | Laporte | 180—5 R |
| 1,892,064 | 12/1932 | Markey | 244—108 |
| 2,085,295 | 6/1937 | Campbell | 244—108 |
| 2,517,481 | 8/1950 | Hager | 244—108 |
| 2,539,817 | 1/1951 | Ditter | 244—108 |
| 2,700,427 | 1/1955 | Schomers | 180—3 |
| 2,970,662 | 2/1961 | Hetteen | 180—5 |

FOREIGN PATENTS

| | | | |
|---|---|---|---|
| 499,819 | 2/1954 | Canada | 180—5 R |
| 1,218,660 | 12/1959 | France | 280—16 |

RICHARD J. JOHNSON, Primary Examiner

U.S. Cl. X.R.

280—26